United States Patent [19]

Yanagisawa et al.

[11] Patent Number: 5,328,741
[45] Date of Patent: * Jul. 12, 1994

[54] OPTICAL RECORDING MEDIUM

[75] Inventors: Shuichi Yanagisawa; Tatsuro Sakai; Satoru Tanaka; Takashi Chuman; Yasushi Araki; Fumio Matsui, all of Saitama, Japan

[73] Assignee: Pioneer Electronic Corporation, Tokyo, Japan

[ * ] Notice: The portion of the term of this patent subsequent to Jul. 5, 2011 has been disclaimed.

[21] Appl. No.: 808,617

[22] Filed: Dec. 17, 1991

[30] Foreign Application Priority Data

Jun. 25, 1991 [JP] Japan .................. 3-153385

[51] Int. Cl.$^5$ .......................................... B32B 3/00
[52] U.S. Cl. .......................................... 428/64; 428/65; 428/457; 428/913; 430/945; 346/76 L; 346/135.1
[58] Field of Search .................. 428/64, 65, 457, 913; 430/945; 346/76 L, 135.1

[56] References Cited

U.S. PATENT DOCUMENTS

| | | |
|---|---|---|
| 4,412,231 | 10/1983 | Namba et al. . |
| 4,600,625 | 7/1986 | Abe et al. . |
| 4,639,745 | 1/1987 | Matsui et al. . |
| 4,696,892 | 9/1987 | Abe et al. . |
| 4,734,904 | 3/1988 | Imanaka et al. . |
| 4,735,889 | 4/1988 | Namba et al. . |
| 4,752,554 | 6/1988 | Sato et al. . |
| 4,908,294 | 3/1990 | Kanno et al. .................. 430/270 |
| 4,940,618 | 7/1990 | Hamada et al. .................. 428/64 |
| 4,977,064 | 12/1990 | Sukawa et al. .................. 430/270 |
| 4,999,281 | 3/1991 | Inagaki et al. . |
| 5,019,476 | 5/1991 | Kanno et al. . |
| 5,079,135 | 1/1992 | Matsuzawa et al. . |
| 5,080,946 | 4/1992 | Takagasi et al. . |

FOREIGN PATENT DOCUMENTS

| | | |
|---|---|---|
| 3636959 | 5/1987 | Fed. Rep. of Germany . |
| 56-80491 | 7/1981 | Japan . |
| 60-259498 | 12/1985 | Japan . |
| 61-175085 | 8/1986 | Japan . |
| 62-229548 | 10/1987 | Japan . |
| 970449 | 10/1982 | U.S.S.R. . |
| 1140157 | 12/1983 | U.S.S.R. . |

Primary Examiner—Patrick J. Ryan
Assistant Examiner—Elizabeth Evans
Attorney, Agent, or Firm—Sughrue, Mion, Zinn, Macpeak & Seas

[57] ABSTRACT

A recordable optical recording medium having a sufficiently high reflectance and modulation factor to comply with the CD specifications. The light-absorbing layer in the optical recording medium has a first cyanine dye having a light absorption band in the wavelength region of recording or reproducing light, and a second cyanine dye having a light absorption band in the wavelength range shorter than the first cyanine dye and having a smaller light absorption in the wavelength region of recording or reproducing light. The second cyanine dye is contained in the light-absorbing layer in an amount larger than the first cyanine dye.

8 Claims, 5 Drawing Sheets

OPTICAL RECORDING MEDIUM

BACKGROUND OF THE INVENTION

1. Field of the Invention

The present invention relates to a recordable optical recording medium and, more particularly, to an optical recording medium having a light-absorbing and a light-reflecting layer formed in superposition on a light-transparent substrate. 2. Description of the Related Art The use organic dyes, such as cyanine and phthalocyanine dyes, in the recording membrane of "recordable" optical recording media is generally known. In order to write information on such optical recording media, a laser beam is focused in a small area of the recording membrane and converted to thermal energy which changes the characteristics of the recording layer (i.e., forming a pit). The common practice adopted to insure a smooth change in the properties of the recording membrane is to prepare two substrates each bearing a recording membrane and these substrates are combined together with the two recording membranes facing each other, thereby providing a so-called "air sandwich" structure.

The laser beam used to write data on these type of optical recording media is aimed into the outer face of each transparent substrate so as to form an optically readable pit in either or both of the recording membranes. In order to reproduce the recorded data, a reading laser beam having a lower power than the writing beam is focused onto the pit surface and the contrast between the area where the pit is formed and the area where no pits are formed is read as an electric signal.

Media of the read-only memory (ROM) type having prerecorded data are also available and have been commercially used in the audio recording and information processing fields. The ROM media have no recording membrane into which data can be recorded. Stated more specifically, prepits which correspond to the data to be reproduced are preformed in the surface of a plastic substrate by press forming with a master. Then, a reflecting layer made of a metal such as Au, Ag, Cu or Al is formed over the prepits and then a protective layer typically is formed on the reflecting layer.

A typical class of ROM media are compact disks which are commonly referred to as CDs. Information is written into and read from CDs with signals of standardized specifications. In accordance with such specifications, CD reproducing apparatus are widely used as compact disk players (CD players).

The so-called recordable optical recording media are the same as CDs insofar as a laser beam is used for reading/writing and that both media are in a disk form. It has been strongly desired to develop a recordable medium that complies with the ROM or CD specifications and, as a result, is adapted for use in CD players. However, a problem is encountered in attempts to achieve this object.

In particular, if the air sandwich structure, which is widely adopted in conventional structures of recordable media, is merely replaced by the provision of a light-reflecting layer on the pitted surface of the conventional recordable recording membrane, as needed in a ROM or CD structure, the reflectance and modulation factor of a laser beam cannot be made sufficiently high to satisfy the CD specifications.

SUMMARY OF THE INVENTION

An object of the present invention is to provide a recordable optical recording medium which has a sufficiently high reflectance and modulation factor to comply with the CD specifications.

It has been discovered that this object and other objects of the present invention can be attained by providing an optical recording medium comprising a light-transparent substrate having a light-absorbing layer which, in turn, is overlaid with a light-reflecting layer, wherein the light-absorbing layer contains a first cyanine dye and a second cyanine dye. Moreover, the first cyanine dye is selected having a light absorption band in a wavelength region of recording or reproducing light, and the second cyanine dye is selected having a light absorption band in a wavelength range shorter than the first cyanine dye and which has smaller light absorption in the wavelength region of recording or reproducing light. Additionally, the second cyanine dye is present in the light-absorbing layer in an amount larger than the amount of first cyanine dye in the light-absorbing layer.

In the present invention, it is desired to record or reproduce information with light having a wavelength range of about 780–830 nm. Therefore, the first cyanine dye to be incorporated in the light-absorbing layer preferably has the following general formula (I):

wherein $R_1$ and $R_2$ are each an alkyl group having 1–8, preferably 3–5, carbon atoms. $X^-$ represents a counter-ion as exemplified by $ClO_4$, $I^-$ or $Br^-$.

The second cyanine dye which is also preferably incorporated into the light-absorbing layer preferably has the following general formula (II):

wherein $R_3$ and $R_4$ are each an alkyl group having 1–8, preferably 3–5, alkyl groups. $X^-$ represents a counter-ion and may be exemplified by the same ions as already mentioned above for this coefficient. In keeping with the broader concepts of the invention, the second cyanine dye of the general formula (II) is present in the light absorbing layer in a greater amount than the first cyanine dye of the general formula (I).

In another embodiment of the present invention, a quencher compound is preferably added to the light absorbing layer for the purpose of preventing deterioration of the cyanine dyes upon exposure to light during handling.

The invention itself, both as to its construction and its method of fabrication, together with additional objects and advantages thereof, will be better understood from the following description of preferred embodiments of the present invention when considered in conjunction with the accompanying drawings.

BRIEF DESCRIPTION OF THE DRAWINGS

FIGS. 3(a)-3(c) are a set of graphs showing the results of various potential measurements on the samples in which the mixing weight ratio of the first to the second cyanine dye was fixed at 1:1 whereas the concentration of the mixture of the two cyanine dyes in solution was varied over the range of 0.015–0.12 mol/l. In particular.

FIGS. 4(a)-(d) are a set of graphs showing the results of various potential measurements on the samples in which the mixing weight ratio of the first to the second cyanine dye was fixed at 2:3 whereas the concentration of the mixture of the two cyanine dyes in solution was varied over the range of 0.04–0.10 mol/l. In particular.

FIGS. 5(a)-(d) are a set of graphs showing the results of various potential measurements on the samples in which the mixing weight ratio of the first to the second cyanine dye was fixed at 1:3 whereas the concentration of the mixture of the two cyanine dyes in solution was varied over the range of 0.075–0.155 mol/l. In particular.

DESCRIPTION OF THE PREFERRED EMBODIMENTS

Figure 1:
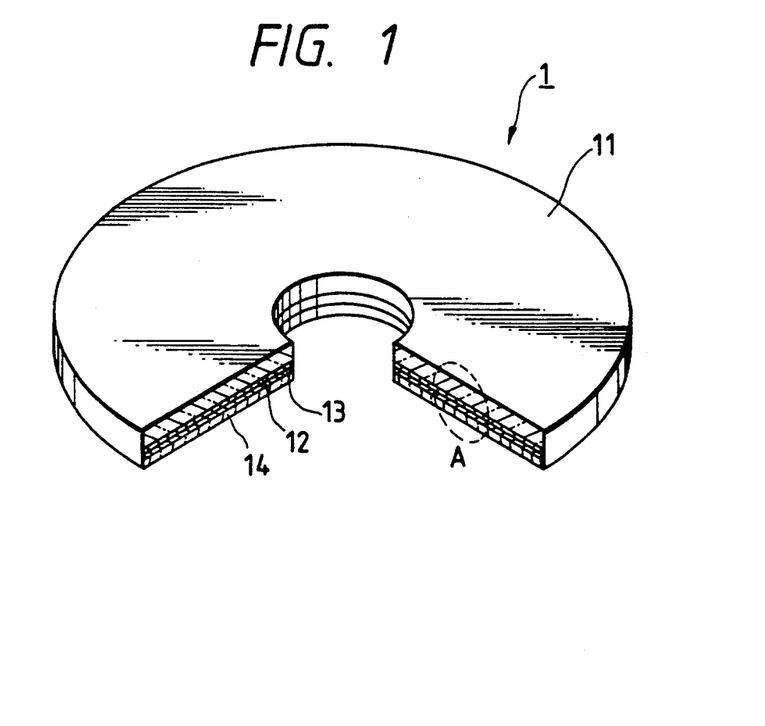
FIG. 1 is a perspective view of a cross-section of the optical recording medium of the present invention.
Figure 2:
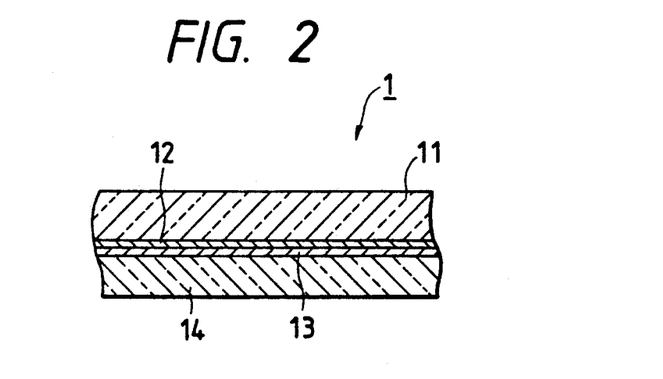
FIG. 2 is an enlarged cross section of the optical recording medium of the present invention.

As shown in FIG. 1, the optical recording medium 1 of the present invention generally comprises a light-transparent substrate 11 that is overlaid with a light-absorbing layer 12, a light-reflecting layer 13 and a protective layer 14, in that sequence.

From the viewpoint of high production rate, the light-transparent substrate 11 is preferably made by injection molding transparent resins such as polycarbonate resins (PC) and polymethyl methacrylate resins (PMMA). The substrate 11 is typically formed in a thickness of about 1.0–1.5 mm.

The substrate 11 is overlaid with the light-absorbing layer 12 which contains a first cyanine dye selected having a light absorption in the wavelength region of recording or reproducing light, and a second cyanine dye is selected having a light absorption band in the wavelength range shorter than said first cyanine dye and having smaller light absorption in the wavelength region of recording or reproducing light. The amount of second cyanine dye in the light-absorbing layer is provided to be larger than the amount of first cyanine dye in the light-absorbing layer.

In the present invention, information is generally recorded or reproduced with light having a wavelength range of 780–830 nm. Therefore, the first cyanine dye to be incorporated in the light-absorbing layer 12 preferably has the following general formula (I):

wherein $R_1$ and $R_2$ are each an alkyl group having 1–8, preferably 3–5, carbon atoms. If the number of carbon atoms in $R_1$ or $R_2$ exceeds 8, accelerated deterioration will occur in a test under hot and humid conditions. Furthermore, the dye will become waxy, causing inconvenience in handling.

In the general formula (I), $X^-$ represents a counterion, as exemplified by $ClO_4$, $I^-$ or $Br^-$.

The second cyanine dye which is also to be incorporated in the light-absorbing layer 12 preferably has the following general formula (II):

wherein $R_3$ and $R_4$ are each an alkyl group having 1–8, preferably 3–5, carbon atoms. If the number of carbon atoms in $R_3$ or $R_4$ exceeds 8, the same disadvantages as described in connection with the general formula (I) will occur.

In the general formula (II), $X^-$ represents a counterion and may be exemplified by the same counterions as already mentioned above.

The second cyanine dye of the general formula (II) is contained in a greater amount than the first cyanine dye of the general formula (I) and the preferred weight ratio of the first to the second cyanine dye is in the range of from 1:1.5 to 1:3. If the second cyanine dye is contained in an amount that is equal to or smaller than the first cyanine dye, it is impossible to achieve the necessary reflectance or, as another possible disadvantage which might occur, the thickness of the dye film cannot be selected at such a value as to achieve a good output between the push-pull tracking error and the reflectance.

The light-absorbing layer 12 containing the first and second cyanine dyes is coated by a conventional means such as spin coating. To coat the light absorbing layer, the concentration of a mixture of the first and second cyanine dyes in solution is in the range of 0.01–0.20 mol/l, with the range of 0.04–0.12 mol/l being more preferred. If the concentration of the dye mixture is less than 0.01 mol/l, the absorption sensitivity that can be achieved is too low to perform signal recording with a semiconductor laser. If the concentration of the dye mixture exceeds 0.20 mol/l, the dyes will not readily dissolve in solvents.

deterioration of the cyanine dyes upon exposure to light.

Representative examples of preferred quenchers are shown below as compounds (Q-1) to (Q-4):

The light-absorbing layer 12 is coated in a thickness that preferably ranges from about 30 to 900 nm, with the range of 100–300 nm being more preferred. If the thickness of the layer 12 is less than 30 nm, the light absorption will decrease to the extent that the sensitivity to light in the operating wavelength of a semiconductor laser is too low to achieve satisfactory signal recording. If the thickness of the layer 12 exceeds 900 nm, the dye layer becomes so thick as to cause increased absorption and hence lower reflectance.

Various known solvents can be used for coating the absorption layer 12, as exemplified by diacetone alcohol, ethyl cellosolve, methanol, tetrafluoropropanol, and the like.

In a still another preferred embodiment of the present invention, a quencher is preferably contained in the light-absorbing layer 12 for the purpose of preventing Among these quenchers, the one represented by the structural formula (Q-1) is particularly preferred for the purpose of preventing the deterioration of the cyanine dyes upon exposure to light.

The light-absorbing layer 12 is then overlaid with the light-reflecting layer 13, which is composed of a metal film such as Au, Ag, Cu or Al. These metal films can be formed by deposition via a suitable technique such as vacuum evaporation, sputtering or ion plating. The light-reflecting layer 13 preferably has a thickness of about 0.02–2.0 μm.

The light-reflecting layer 13 is usually overlaid with the protective layer 14 for protecting the light-absorbing layer 12 and the light-absorbing layer 13. The protective layer 14 is typically formed by a process that consists of spin coating a uv curable resin and then curing it under exposure to uv radiation. Other materials that can be used to form the protective layer 14 include epoxy resins, acrylic resins, silicone resins and urethane resins. The protective layer 14 typically has a thickness of around 0.1-100 μm.

An intermediate layer may be provided between the substrate 11 and the light-absorbing layer 12 in order to protect the substrate 11 from a coating solvent used in the light-absorbing layer. If necessary, an intermediate layer may be provided between the light-absorbing layer 12 and the light-reflecting layer 13 in order to enhance the efficiency of light absorption.

Recording light is applied to the optical recording medium of the present invention as the medium rotates, whereupon a part of the light-absorbing layer 12 which is struck by the light is melted away to form a pit. To reproduce the recorded data, reading light is applied to the medium as it rotates and a difference is detected between the intensity of the light reflected from the area where the pit is formed and that of the light reflected from the area where no pits are formed and the difference is read as an electric signal.

The present invention is described below in greater detail by reference to the following nonlimiting examples.

EXAMPLES

Dyes (D-1) and (D-2) identified below were used as the first and second cyanine dyes, respectively, to be contained in the light-absorbing layer. These dyes were dissolved in ethyl cellosolve and the solution was coated in a thickness of 250 nm onto a polycarbonate substrate having a diameter 120 mm and a thickness of 1.2 mm. A spiral groove was preliminarily formed on the substrate by injection molding.

A gold (Au) light-reflecting layer was deposited in a thickness of 0.1 μm on the light-absorbing layer by vacuum evaporation. A photopolymer protective film was then formed on the light-reflecting layer.

By this basic procedure, various samples of optical recording medium were fabricated, with the mixing weight ratio of the first cyanine dye to the second cyanine dye being varied at 1:1, 2:3 and 1:3 and with the concentration of the mixture of the cyanine dyes in solution being varied over the range of 0.01-0.16 mol/l.

First cyanine dye (D-1)

Figure 6:
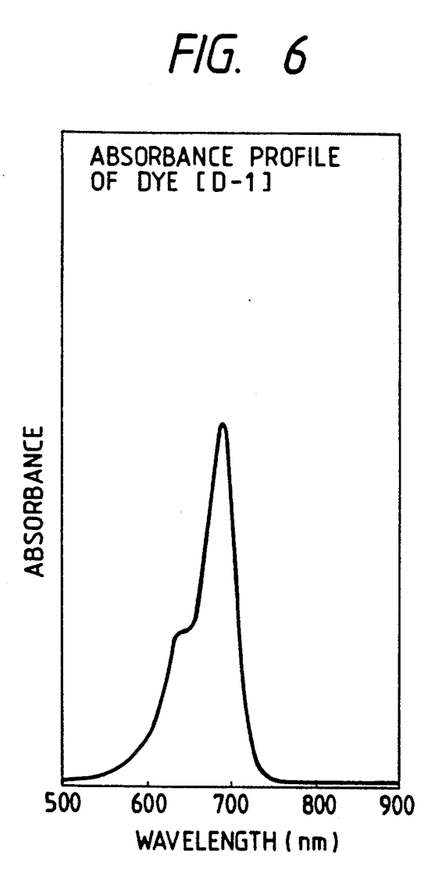
FIG. 6 is a graph showing the absorption characteristic of the first cyanine dye (D-1), described herein.

Dye of the general formula (I) wherein $R_1$, and $R_2$ are each n-$C_4H_9$ and $X^-$ is $ClO_4^-$. The absorbance characteristic of the dye (D-1) is depicted in FIG. 6 showing the dye has a light absorption band at 580–720 nm.

Second cyanine dye (D-2)

Figure 7:
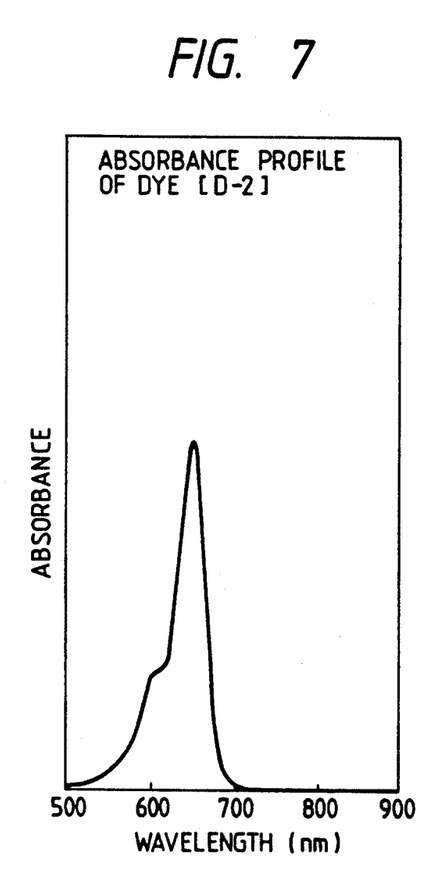
FIG. 7 is a graph showing the absorption characteristic of the second cyanine dye (D-2), described herein.

Dye of the general formula (II) wherein $R_3$ and $R_4$ are each n-$C_3H_7$ and $X^-$ is $ClO_4^-$. The absorbance characteristic of the dye (D-2) is depicted in FIG. 7 showing the dye has a light absorption band at 540–680 nm.

EFM signals were recorded and reproduced from the respective media samples under the following conditions.

EFM signal record/reproduce conditions
Wavelength: 778 nm
Linear speed: 1.4 m/s
Write power: 6.0 mW
Read power: 0.5 mW For each of the media with which recording was conducted under the conditions specified above, the following eight potentials were measured: potential in the specular portion, $I_O$; potential in the land, $I_l$; potential in the groove, $I_g$; potential in the brightest portion of recorded signals that had an amplitude of 11 T (196 kHz), $I_{top}$; potential of recorded signals that had an amplitude of 11 T (196 kHz), $I_{11T}$; potential of recorded signals that had an amplitude of 3 T (720 kHz), $I_{3T}$; push-pull tracking error potential, $TE_{pp}$; and three-beam tracking error potential, $TE_{3b}$.

The results of potential measurements are shown in FIGS. 3(a)-3(c), FIGS. 4(a)-4(d) and FIGS. 5(a)-5(d).

Figure 3A:
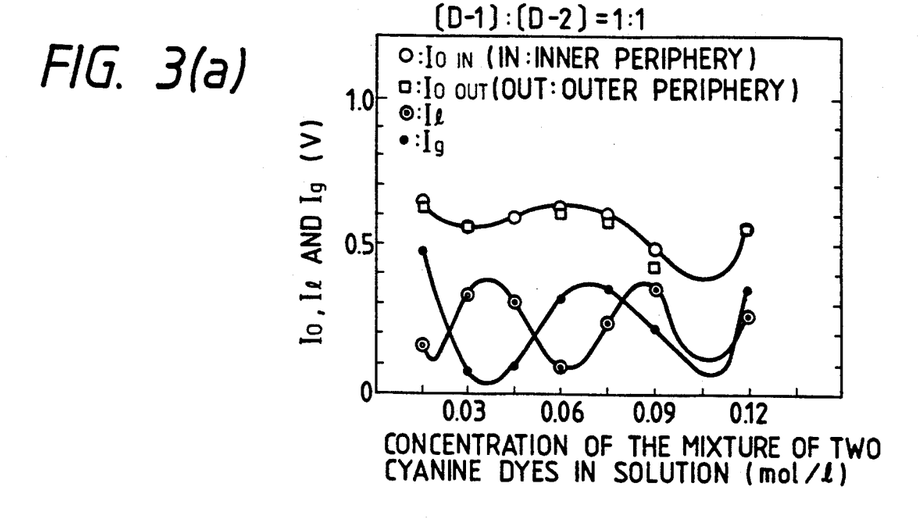
FIG. 3(a) is a graph showing the profiles of specular potential $I_O$, and potential $I_I$ and groove potential $I_g$.
Figure 3B:
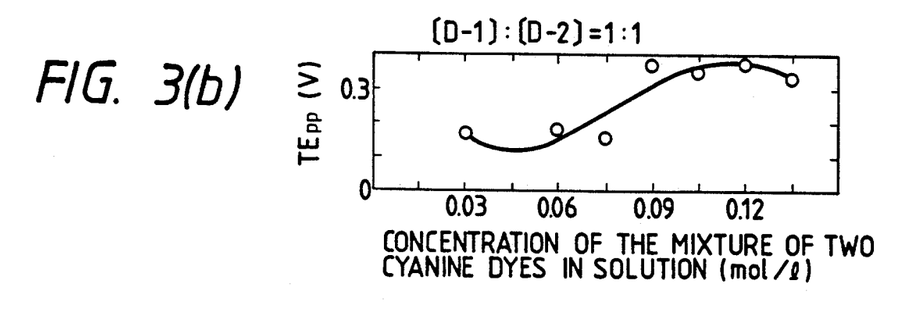
FIG. 3(b) is a graph showing the profile of push-pull tracking error potential $TE_{pp}$.
Figure 3C:
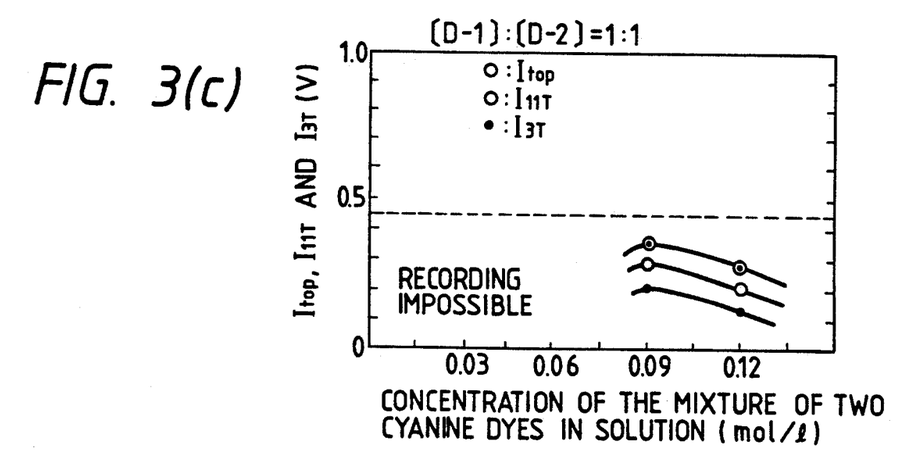
FIG. 3(c) is a graph showing the profile $I_{top}$, $I_{11T}$ and $I_{3T}$.

FIGS. 3(a)-(c) are a set of graphs showing the results of potential measurements on the samples in which the mixing weight ratio of the first to the second cyanine dye was fixed at 1:1 whereas the concentration of the mixture of the two cyanine dyes in solution was varied over the range of 0.015-0.12 mol/l. Stated more specifically, FIG. 3(a) is a graph showing the profiles of specular potential $I_l$ and groove potential $I_g$; FIG. 3(b) is a graph showing the profile of push-pull tracking error potential $TE_{pp}$; and FIG. 3(c) is a graph showing the profiles of $I_{top}$, $I_{11T}$ and $I_{3T}$.

Figure 4A:
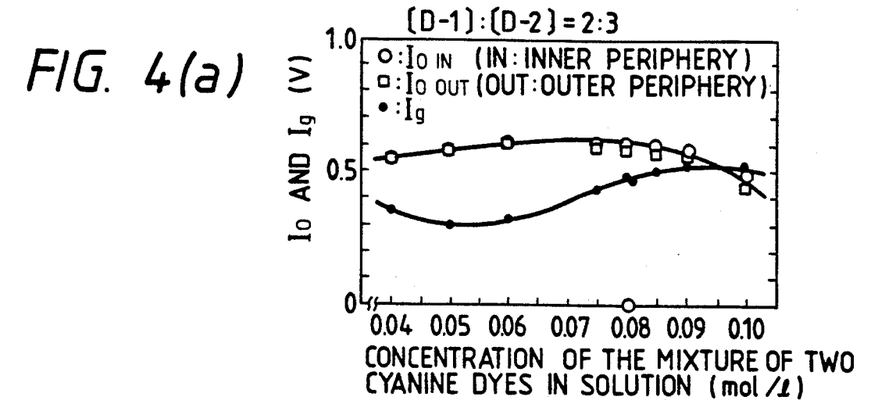
FIG. 4(a) is a graph showing the profiles of specular potential $I_O$ and groove potential $I_g$.
Figure 4B:
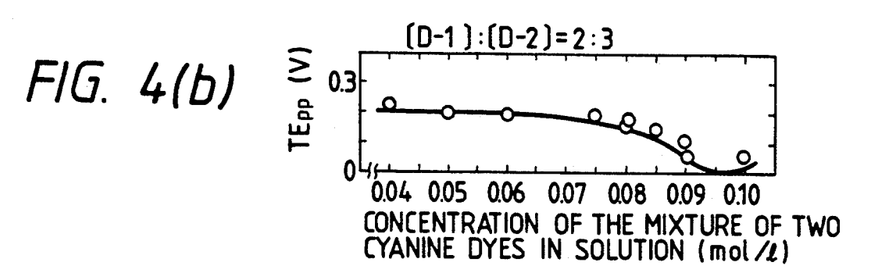
FIG. 4(b) is a graph showing the profile of push-pull tracking error potential $TE_{pp}$.
Figure 4C:
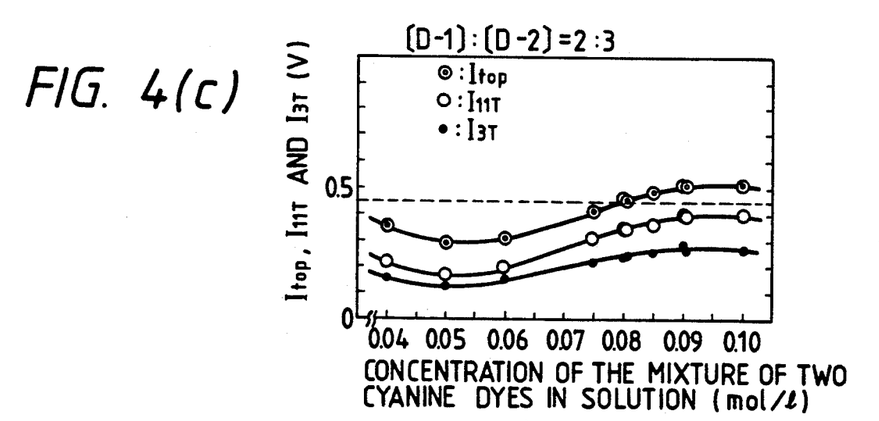
FIG. 4(c) is a graph showing the profiles of $I_{top}$, $I_{11T}$ and $I_{3T}$.
Figure 4D:
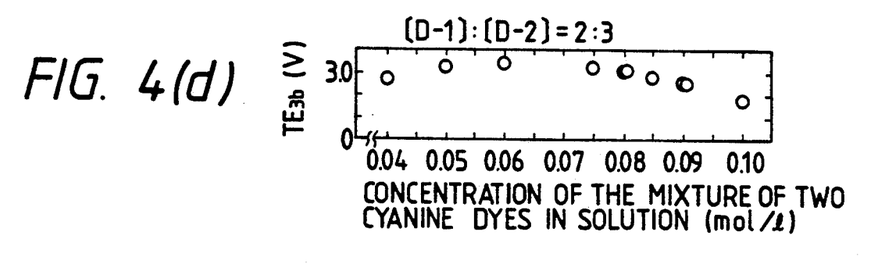
FIG. 4(d) is a graph showing the profile of three-beam tracking error potential $TE_{3b}$.

FIGS. 4(a)-(d) are a set of graphs showing the results of potential measurements on the samples in which the mixing weight ratio of the first to the second cyanine dye was fixed at 2:3 whereas the concentration of the mixture of the two cyanine dyes in solution was varied over the range of 0.04-0.10 mol/l. Stated more specifically, FIG. 4(a) is a graph showing the profiles of specular potential $I_O$ and groove potential $I_g$; FIG. 4(b) is a graph showing the profile of push-pull tracking error potential $TE_{pp}$; FIG. 4(c) is a graph showing the profiles of $I_{top}$, $I_{11T}$ and $I_{3T}$; and FIG. 4(d) is a graph showing the profile of three-beam tracking error potential $TE_{3b}$.

Figure 5A:
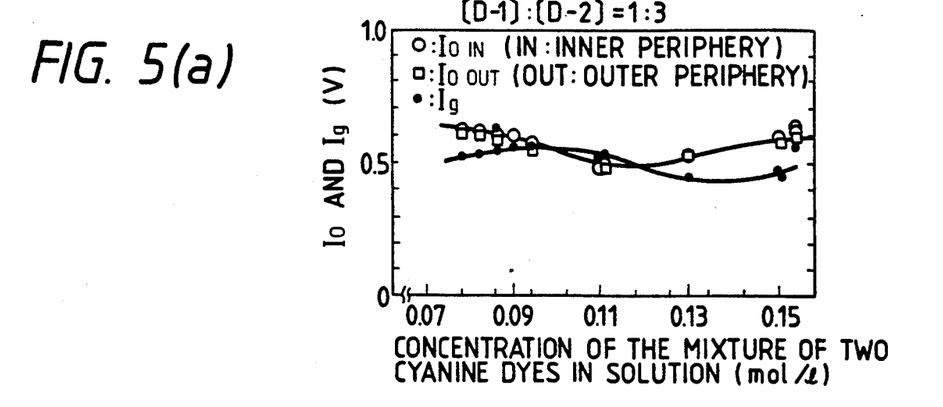
FIG. 5(a) is a graph showing the profiles of specular potential $I_O$ and groove potential $I_g$.
Figure 5B:
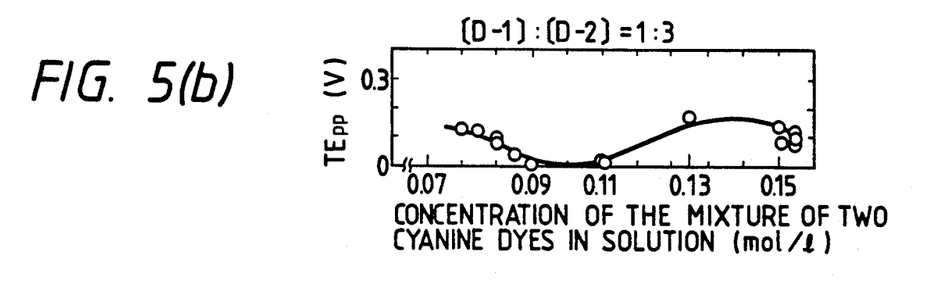
FIG. 5(b) is a graph showing the profile of push-pull tracking error $TE_{pp}$.
Figure 5C:
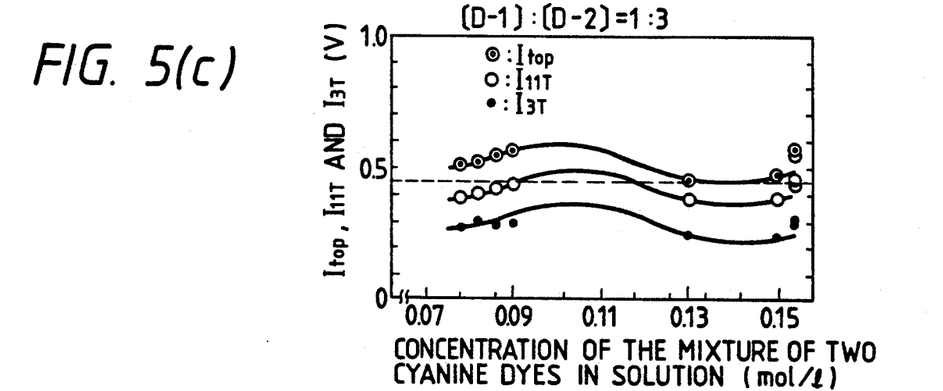
FIG. 5(c) is a graph showing the profiles of $I_{top}$, $I_{11T}$ and $I_{3T}$.
Figure 5D:
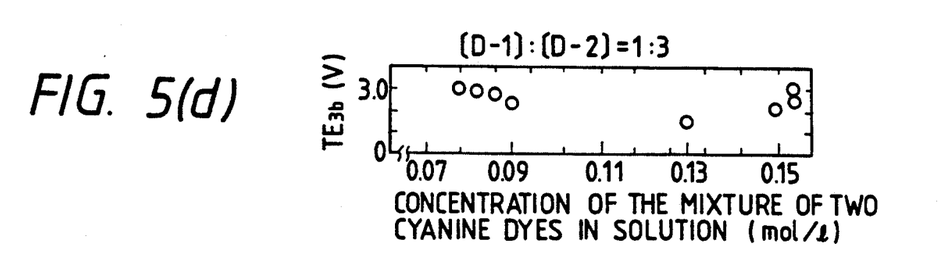
FIG. 5(d) is a graph showing the profile of three-beam tracking error $TE_{3b}$.

FIGS. 5(a)-(d) are a set of graphs showing the results of potential measurements on the samples in which the mixing weight ratio of the first to the second cyanine dye was fixed at 1:3 whereas the concentration of the mixture of the two cyanine dyes in solution was varied over the range of 0.075-0.155 mol/l. Stated more specifically, FIG. 5(a) is a graph showing the profiles of specular potential $I_O$ and groove potential $I_g$; FIG. 5(b) is a graph showing the profile of push-pull tracking error $TE_{pp}$; FIG. 5(c) is a graph showing the profiles of $I_{top}$, $I_{11T}$ and $I_{3T}$; and FIG. 5(d) is a graph showing the profile of three-beam tracking error potential $TE_{3b}$.

Evaluating the respective samples on the basis of the results shown in the graphs in FIGS. 3-5, one can see that the following conditions should be satisfied in order to reproduce signals in accordance with the CD format:

(1) $I_l > I_g$ and $I_O > I_g$;

(2) push-pull tracking error $TE_{pp}$ must be at least 0.04V in order to perform tracking servo control in a consistent manner and to thereby insure reliable recording; (3) since a reflectance of at least 65% is necessary, $I_{top}$ must be at least 0.45V under the conditions for recording and reproduction set forth above and, at the same time, the ratio $I_{11T}/I_{top}$ must be at least 60% whereas the ratio $I_{3T}/I_{top}$ must be in the range of 30-70% in order to insure adequate reflectance and high modulation factor; and (4) the three-beam tracking error potential $TE_{3b}$ must be at least 2.5V which is comparable to the $TE_{3b}$ of commercial CDs and this is in order to insure that recorded signals (pits) are reproduced in a consistent manner on CD players.

The graphs in FIGS. 3-5 show that the first condition to be met in order to satisfy all of the above-listed requirements (1)-(4) is that the second cyanine dye (D-2) be contained in a greater amount than the first cyanine dye (D-1) in the light absorbing layer, e.g. (D-1)/(D-2)=2:3 or 1:3 as shown in FIGS. 4 or 5.

The second condition to be met in order to satisfy the above-listed requirements (1)-(4) is that the concentration of the two cyanine dyes (D-1) and (D-2) in solution be within the range of 0.08-0.09 mol/l for the combination of dyes (D-1) and (D-2). According to FIG. 5, the concentration range in the neighborhood of 0.15 mol/l also appears to be appropriate. However, but in this range, the concentration of the mixture of two dyes is so high that considerable difficulty is involved in forming a uniform solution. As a consequence, even if a solution forms, precipitation will ensue rather quickly thereafter on account of the high concentration of the dye mixture, causing a substantial practical problem.

It was verified that optimal electric characteristics could be attained by the above specified combination of dyes and at the stated thickness of the dye film. When additional experiments were performed with the same protocol as above except with the thickness of the dye film being adjusted to various values other than 250 nm, it was found that the concentration of the dyes in solution was by no mean limited to a very narrow range. Instead, it was observed that the optimal dye concentration range will vary within the broader range of 0.01 to 0.20 mol/l partially as a function of the dye film thickness.

As is clear from the foregoing description, the optical recording medium of the present invention, which can contain the exemplified cyanine dyes in the exemplified amounts in the light-absorbing layer, represents a recordable optical recording medium that achieves a sufficiently high reflectance and modulation factor to comply with the CD specifications.

While the invention has been described in detail and with reference to specific embodiments thereof, it will be apparent to one skilled in the art that various changes and modifications can be made therein without departing from the spirit and scope thereof.

What is claimed is:

1. An optical recording medium comprising a light-transparent substrate, a light-absorbing layer having a thickness of about 30 to 900 nm disposed on said substrate, and a light-reflecting layer disposed on said light-absorbing layer, wherein said light-absorbing layer contains a first cyanine dye and a second cyanine dye, and said first cyanine dye has a light absorption band in a wavelength region of recording or reproducing light, and said second cyanine dye has light absorption band in wavelength range shorter than said first cyanine dye and has smaller light absorption in said wavelength region of recording or reproducing light, and said second cyanine dye is present in said light-absorbing layer in an amount greater than said first cyanine dye, and wherein said first cyanine dye and said second cyanine dye are present in said light absorbing layer in a weight ratio range of 1:1.5 to 1:3, respectively, and wherein information is recorded or reproduced in said light-absorbing layer in a wavelength region of about 780-830 nm.

2. An optical recording medium according to claim 1, wherein said light-absorbing layer is formed from a coating comprising a total mixture of said first cyanine dye and said second cyanine dye in a coating solution in a concentration of from 0.01 to 0.20 mol/l before coating and drying.

3. An optical recording medium according to claim 1, wherein said first cyanine dye is represented by the following general formula (I):

wherein $R_1$ and $R_2$ are each an alkyl group having 1-8 carbon atoms, and $X^-$ is a counter ion; and said second cyanine dye is represented by the following general formula (II):

wherein $R_3$ and $R_4$ are each an alkyl group having 1-8 carbon atoms, and $X^-$ is a counter ion.

4. An optical recording medium according to claim 3, wherein $R_1$ and $R_2$ each represent n-$C_4H_9$ in formula (I), and $R_3$ and $R_4$ each represent n-$C_3H_7$ in formula (II), and $X^-$ represents $ClO_4^-$ for each of formula (I) and formula (II).

5. An optical recording medium according to claim 1, wherein
    said light-absorbing layer further contains a quencher compound which prevents deterioration of said first and second cyanine dyes upon exposure to light.

6. An optical recording medium according to claim 5, wherein said quencher comprises a compound represented by formula (Q-1):

7. An optical recording medium according to claim 1, wherein said reflecting layer comprises a metal selected from the group consisting of Au, Ag, Cu or Ag, and is present in a thickness of about 0.02 to 2.0 μm.

8. An optical recording medium according to claim 1, further comprising a protective layer disposed on said reflecting layer.

* * * * *